April 24, 1956    E. W. NAGEL    2,743,349
OVEN HEATING UNIT
Filed Feb. 5, 1952
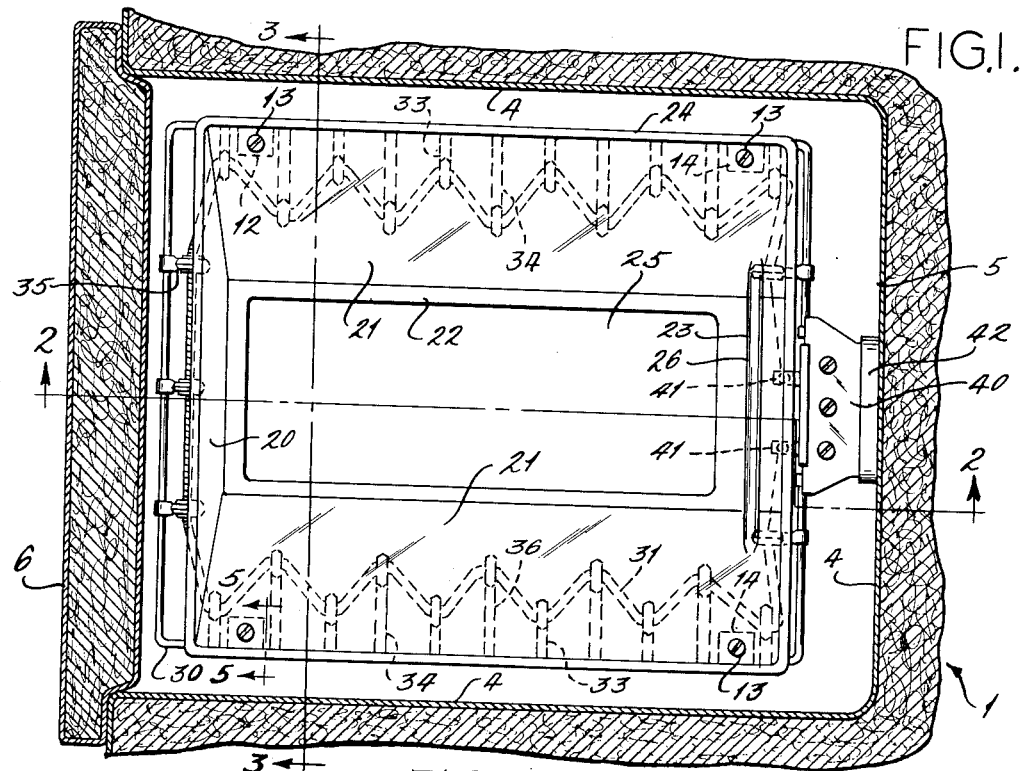
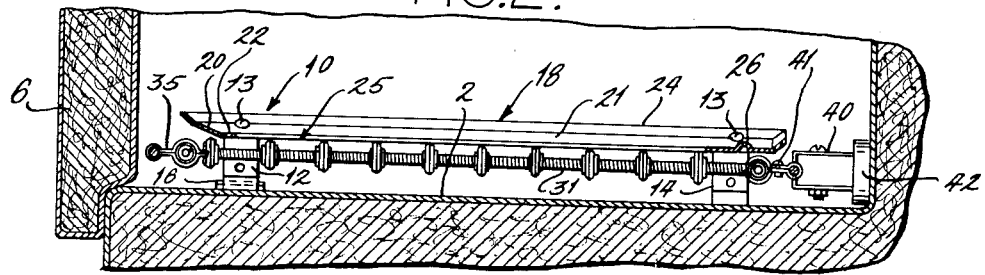
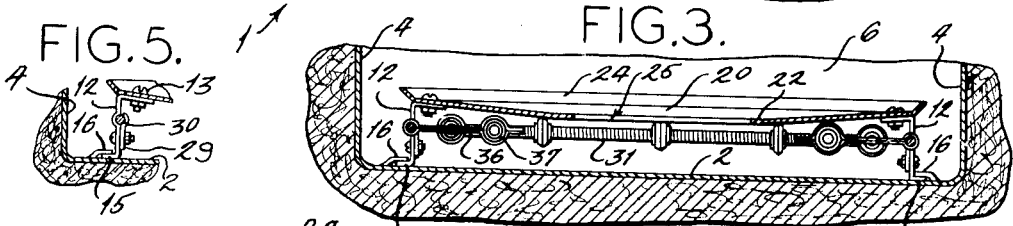
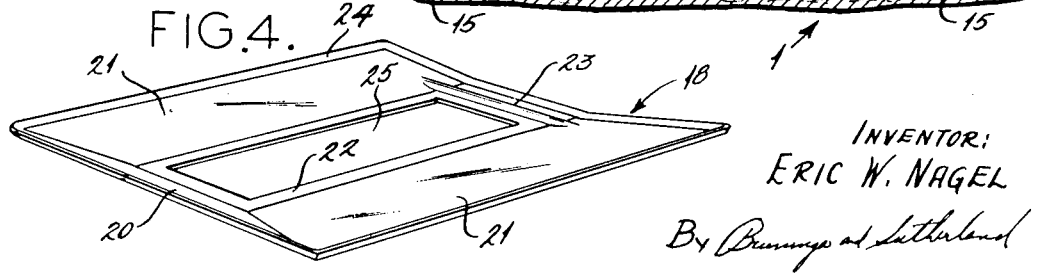
INVENTOR:
ERIC W. NAGEL
By Bruninga and Sutherland
ATTORNEYS.

United States Patent Office 2,743,349
Patented Apr. 24, 1956

2,743,349
OVEN HEATING UNIT

Eric W. Nagel, St. Louis County, Mo., assignor to Wrought Iron Range Company, St. Louis, Mo., a corporation of Missouri Application February 5, 1952, Serial No. 269,991

3 Claims. (Cl. 219—35)

This invention relates to range ovens of the character in which the main source of heat is positioned along the bottom wall of the oven, and has particular application to electric ranges.

In electric range ovens known heretofore in which the electric heating elements were arranged along the bottom wall of the oven, the distribution of effective heat through the oven has not been uniform. By "effective heat" is meant the total cooking heat from radiation and convection at any point. It has been discovered that by properly and carefully controlling the convection currents in such an oven, an oven is obtained in which uniform cooking results are obtained at any location or set of locations within the oven. That is to say, in an oven constructed in accordance with the present invention, the effective heat is uniformly distributed throughout the entire oven.

One of the objects of this invention is to provide means in an oven in which the main source of heat is along the bottom thereof, by which the effective heat in the oven is made uniform throughout the oven. Other objects will become apparent to those skilled in the art in the light of the following description and accompanying drawing.

In accordance with this invention, generally stated, an oven heating unit positioned along the bottom of the oven is provided which is so constructed and arranged as to set up convection currents rising at each side of the oven and at the front thereof, so controlled and directed as to produce a uniform distribution of the effective heat throughout the oven.

In the drawing:

Figure 1 is a plan view partly in section of an oven provided with a heating unit constructed in accordance with this invention;

Figure 2 is a sectional view taken along the line 2—2 of Figure 1;

Figure 3 is a sectional view taken along the line 3—3 of Figure 1;

Figure 4 is a view in perspective of the distributing plate of the heating element shown in Figures 1–3; and Figure 5 is a sectional view taken along the line 5—5 of Figure 1.

Referring now to the drawing for an illustrative embodiment of this invention, 1 represents an oven having a bottom wall 2, a top wall not shown in the drawing, side walls 4, back wall 5 and door 6. The door 6 constitutes the front wall of the oven. Supported by the bottom 2 is a heating unit 10. The heating unit 10 comprises a distributing plate 18; a pair of front legs 12 mounted on the distributing plate near its forward edge; a pair of rear legs 14 mounted on the distributing plate near its back edge; a stiff rod frame 30 mounted on and supported by the legs 12 and 14; a heating element 31, supported by the frame 30 by means of insulated brackets 33 and 34 to form a definite pattern beneath the distributing plate 18; and a terminal plug 40, secured to the frame 30.

The distributing plate 18 is, in the embodiment shown, made in one piece. However, it is shaped to define a front panel 20, two side panels 21, and a back panel 23, arranged about a central rectangular opening 25. A flat border 22 extends around the central opening 25, defining a plane of reference from which the angular inclination of the panels will hereafter be reckoned. An upturned lip 24, of uniform width and inclination (45° from the plane of the border in the embodiment shown) extends completely around the outer edge of the distributing plate 18. Around the front and side panels 20 and 21, the upper edge of the lip 24 lies in a plane parallel with the reference plane. Between the border 22 and the lip 24, the front panel 20 is inclined upwardly (at an angle of 28°30′ in the embodiment shown). Between the border 22 and the lip 24 the side panels 21 are inclined upwardly (at an angle of approximately 5°30′ in the embodiment shown). In the embodiment shown, in which the side and front panels meet on straight lines extending between the forward outer corners of the border 22 and the forward inner corners of the lip 24, the controlling factor in the inclination of the side panels is the inclination of the front panel. The side panels 21 extend from their juncture with the front panel, straight back to the lip 24 along the rear edge of the distributing plate 18. The back panel constitutes in effect an extension of the border 22 from the rear edge of the central opening 25 to the lip 24, except that a stiffening rib 26 traverses the back panel midway between the rear edge of the opening 25 and of the distributing plate 18. The rib 26 extends as far straight into the side panels 21 at either side of the back panel as its height admits.

The front legs 12 and rear legs 14 are provided with a flange at their upper ends, so formed as to conform to the slope of the side panels when the legs are vertical and to permit the legs to be fastened to the under side of side panels 21 by means of bolts 13. Each of the legs is bent to form a transverse channel on the inside of the leg at a fixed distance from the upper end of the leg. The front legs 12 are taller than the rear legs 14 and are provided at their lower ends with feet 15. When the heating unit 10 is in place in the oven, the feet 15 project beneath clips 16 which are secured to the bottom wall 2 of the oven, to hold down and locate the heating unit. The difference in height of the front and rear legs of the heating unit 10, produces an inclination of the distributing plate from front to back. In the embodiment shown, this inclination is approximately 1°15′.

The stiff rod frame 30 is mounted in and positioned by the transverse channels in the inner faces of the legs 12 and 14. Since the channels are spaced equally from the upper ends of their respective legs, and the legs are symmetrically mounted at points of equal elevation above the reference plane, the frame 30 is uniformly spaced from the reference plane of the distributing plate 18. The frame 30 is held securely within the channels by tabs 29 bolted to the legs. As shown in particular in Figures 1 and 3 the rod 30 extends beyond the deflecting plate 18, along the front and back edges of the deflecting plate, and beneath the deflecting plate 18 along the side panels 21.

Heating element-holding brackets 33 and 34 are securely fastened to the rod frame 30. Brackets 33 have short shanks 35, while brackets 34 have long shanks 36. Both brackets 33 and 34 are fitted near their free ends with porcelain ring insulators 37. Along and beneath the side panels 21, the brackets 33 and 34 alternate, with short-shanked brackets 33 at either end, as shown in Figure 1.

The heating element 31 is threaded through the porcelain insulating rings 37, describing a zig-zag pattern beneath the side panels 21, and running along the front panel near the inner edge of the lip 24. In the embodiment shown, the heating element is in the form of a coiled wire (Nichrome or the like) beneath the front and side panels, with uncoiled sections running from either side to terminals 41 of the terminal plug 40. The terminal plug 40 carries contact prongs, not here shown, which are electrically connected to the appropriate terminals 41 and take into an electric socket 42 mounted in the back wall 5 of the oven.

The relative dimensions of the heating unit and the oven, the positioning of the heating unit in the oven and the proportioning of the heating unit itself are of great importance in obtaining a uniform distribution of effective heat in the oven. Sufficient space must be allowed between the oven walls and the heating unit to allow free circulation of the oven atmosphere past the edges of the distributing plate. As an illustrative example, it has been found that for an oven 14" high, 18" wide and 20¼" deep, optimum distribution of effective heat is obtained with a heating unit 14¾" wide and 17" deep; 1¹³⁄₁₆" high at the rear and 2³⁄₁₆" high at the front edge; with a central opening 5" wide and 13½" deep, surrounded by a border ½" wide, and located 1½" from the front edge; with a ¼", 45° lip around the distributing plate; a front panel inclined 28°30' between the border and the lip; side panels inclined approximately 5°30' between the border and the lip; the heater element along the side panels zig-zagging between ¾" and 2¼" from the outer edge, the brackets therealong being spaced on 1½" centers; the rear edge of the distributing plate being spaced 2¾" from the back wall, and the heater unit being spaced substantially equally from the side walls.

The inclination of the distributing plate from front to back, and the provision of the upturned front panel are of particular importance in this invention. It has been found that a distributing plate provided with a central opening and upturned side panels but with no front-to-rear inclination and no upturned front panel gives an improved distribution over an oven the bottom wall of which is simply heated, but it does not give a completely uniform distribution.

While small variations from the proportions indicated in the detailed description of the illustrative embodiment produce a marked effect upon the distribution of effective heat, the provision of a heating unit of the general form shown in the drawings, with an upwardly inclined front panel, greatly improves the distribution pattern over a plain-bottomed oven through a wide range of inclinations and proportions of the parts of the unit.

To install the heating unit, the contact prongs of the terminal plug 40 are inserted within the electric socket 42, and, as the prongs are pushed home, the feet 15 are slid beneath the clips 16, thus positioning the heating unit. When the current is turned on, the heater element becomes hot. Controlled convection currents are set up. The inclination of the side panels, and the positioning of the heating element thereunder, directs a rising current of gases, through the full depth of the distributing plate, along the side walls 4 to the top of the oven, where it turns and descends through the central opening 25 to complete the cycle. At the same time, however, the inclination of the front panel and the positioning of the heater element thereunder directs another rising current of hot gases along the oven door, compensating for the heat loss along that surface, and providing a uniform distribution of heat. The behavior of the currents of gases is not certainly known, e. g. whether there is a complete cycle from front to back, but the results have been thoroughly verified.

Thus it can be seen that an oven heating unit is provided which accomplishes the uniform distribution of effective heat throughout the interior of the oven in which it is.

Having thus described my invention what is claimed and desired to be secured by Letters Patent is:

1. In an oven having a front door and bottom, top, side and back walls, an oven heating unit comprising a distributing plate having a circumferential lip, front, side and back panels arranged about an opening defined by a border, said front and side panels being upwardly inclined from said opening, said distributing plate being mounted in said oven to incline downwardly from the horizontal from front to back, and an electric heater element between said bottom wall and said distributing plate describing a zig-zag pattern beneath said side panels and extending along said front panel near its forward edge, said heating unit bearing approximately the same proportionate relationship to said oven as a unit of the following dimensions bears to an oven 18 inches wide and 20¼ inches deep:

Width of distributing plate—14¾ inches
Depth of distributing plate—17 inches
Height of distributing plate, at rear (above bottom wall)—1¹³⁄₁₆ inches
Height of distributing plate, at front (above the bottom wall)—2³⁄₁₆ inches
Width of opening—5 inches
Depth of opening—13½ inches
Width of border along front and side panels—½ inch
Width of lip—¼ inch
Inclination of lip—45°
Inclination of front panel—28°30'
Inclination of side panels—5°30'.
Distance from rear edge of distributing plate to back wall—2¾ inches.

2. In an oven having a front door and bottom, top, back and side walls, an oven heating unit positioned wholly within the oven and spaced from said door and from said back and side walls, said unit comprising a distributing plate over-lying and spaced a short distance, relative to the height of the oven, from the bottom wall, said plate having a front panel and two side panels arranged about an opening in the distributing plate, said front panel being substantially narrower than said side panels, said front and side panels being upwardly inclined in a direction away from said opening, the angle of upward inclination of the front panel being sufficiently greater than that of the side panels to provide a more vigorous updraft of heated air along the door of the oven than along the sides thereof; and an electric heater element positioned between the bottom wall and the distributing plate, said heater element extending along the edge of the front panel adjacent the door, said front panel forming with the door when the door is closed, a funnel-shaped flue immediately above the heater element.

3. The oven heating unit of claim 2 wherein the entire distributing plate is upwardly inclined from back to front with respect to the bottom wall of the oven.

References Cited in the file of this patent

UNITED STATES PATENTS

| | | |
|---|---|---|
| 2,408,295 | Cossin | Sept. 24, 1946 |
| 2,442,900 | McCormick | June 8, 1948 |
| 2,511,328 | Cline | June 13, 1950 |
| 2,536,613 | Schulze et al. | Jan. 2, 1951 |